May 15, 1956 J. R. CAMPBELL 2,745,333
COFFEE MAKING APPARATUS
Filed July 10, 1950 7 Sheets-Sheet 1

INVENTOR.
James R. Campbell.
BY
ATTORNEYS.

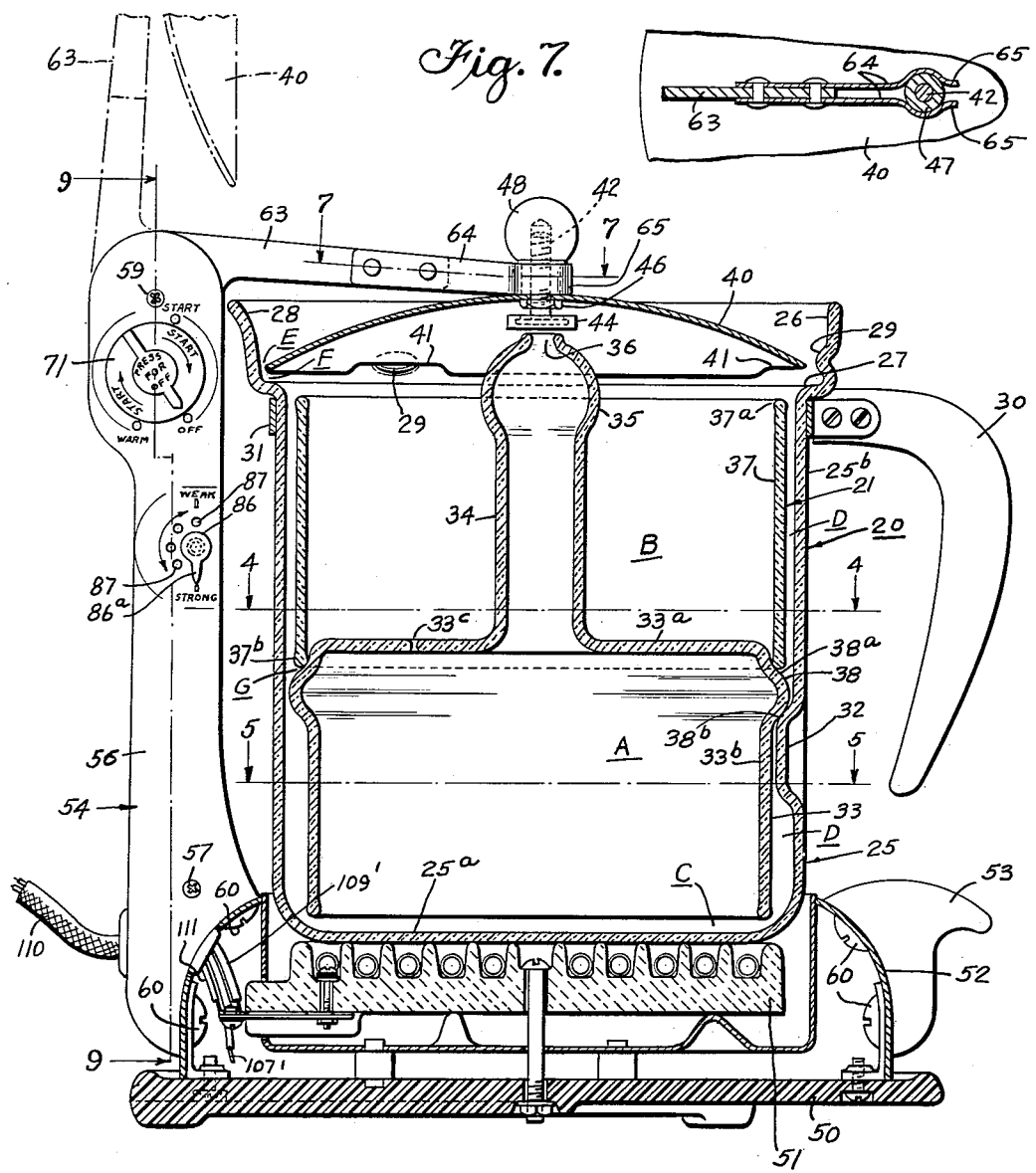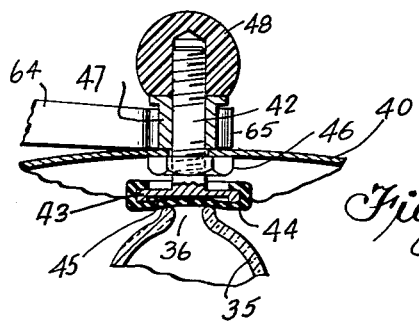

May 15, 1956 J. R. CAMPBELL 2,745,333
COFFEE MAKING APPARATUS
Filed July 10, 1950 7 Sheets-Sheet 3
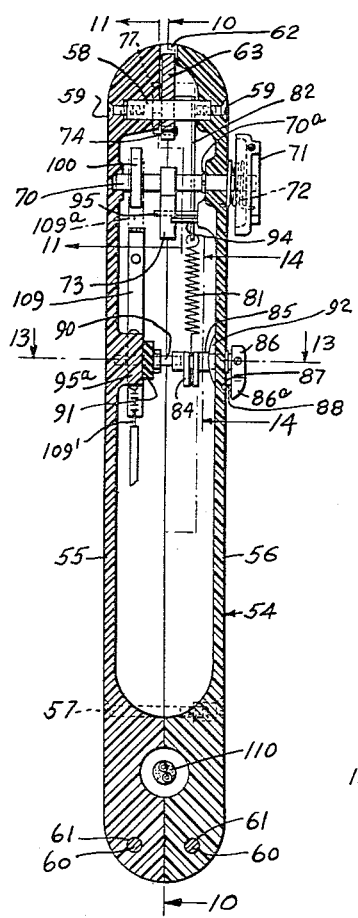
Fig. 9.
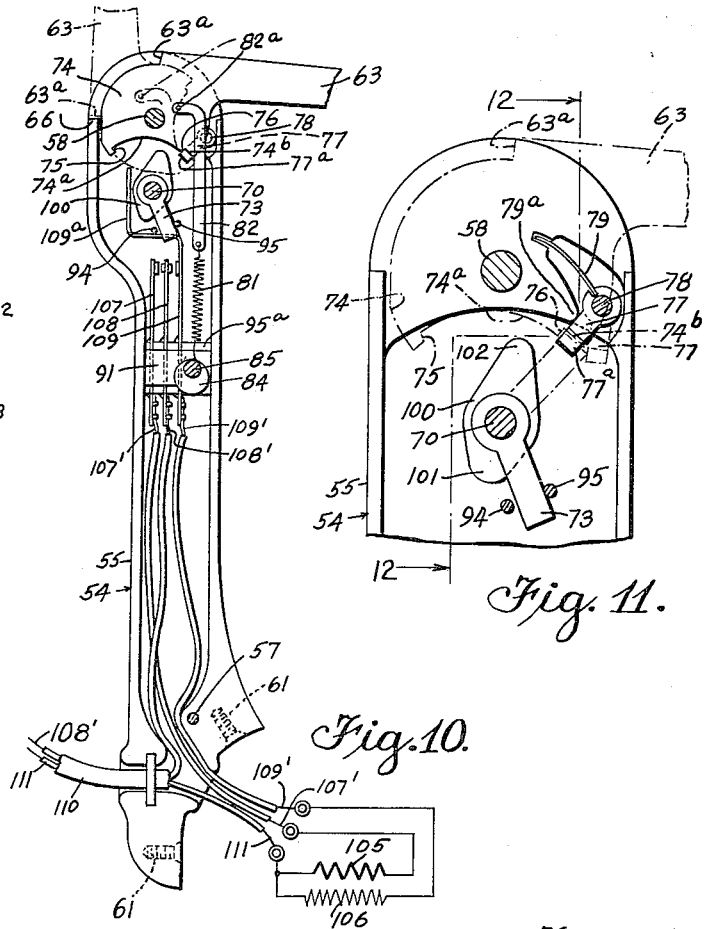
Fig. 10.
Fig. 11.
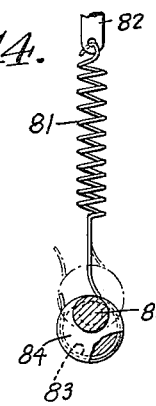
Fig. 14.
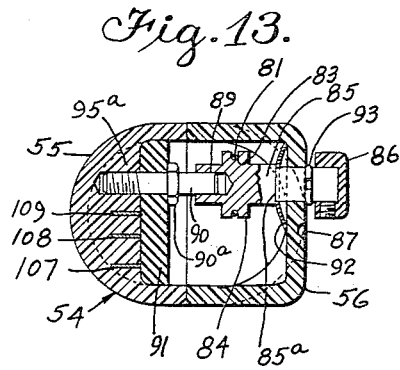
Fig. 13.
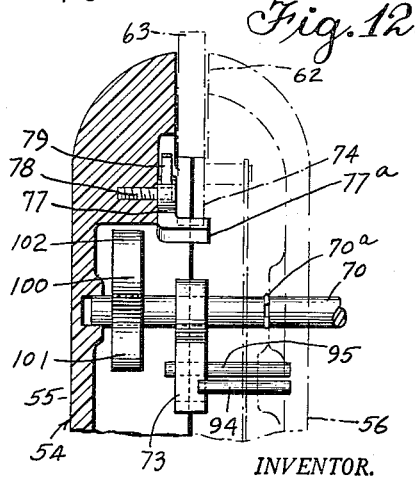
Fig. 12.
INVENTOR.
James R. Campbell.
BY
Knight & Roslyn
ATTORNEYS.

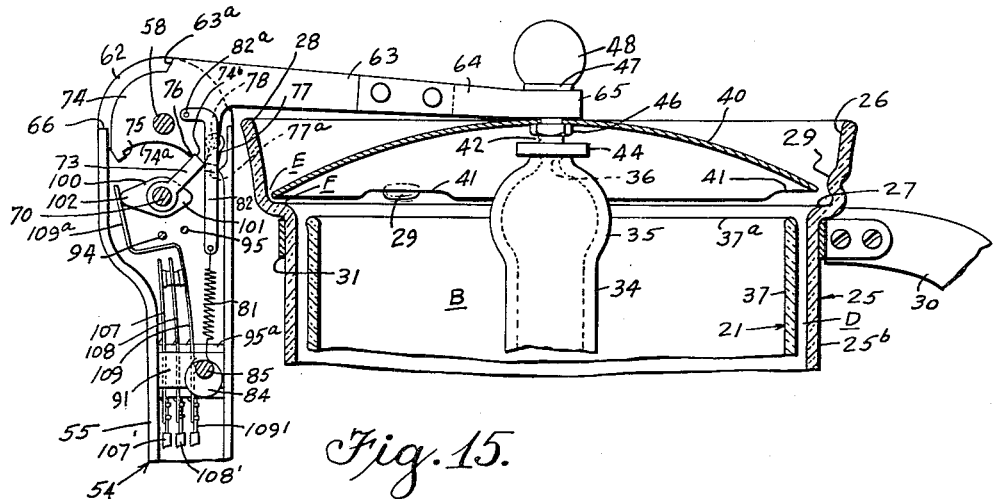

May 15, 1956 J. R. CAMPBELL 2,745,333
COFFEE MAKING APPARATUS
Filed July 10, 1950 7 Sheets-Sheet 5

INVENTOR.
James R. Campbell.
BY
ATTORNEYS.

May 15, 1956     J. R. CAMPBELL     2,745,333
COFFEE MAKING APPARATUS
Filed July 10, 1950     7 Sheets-Sheet 6
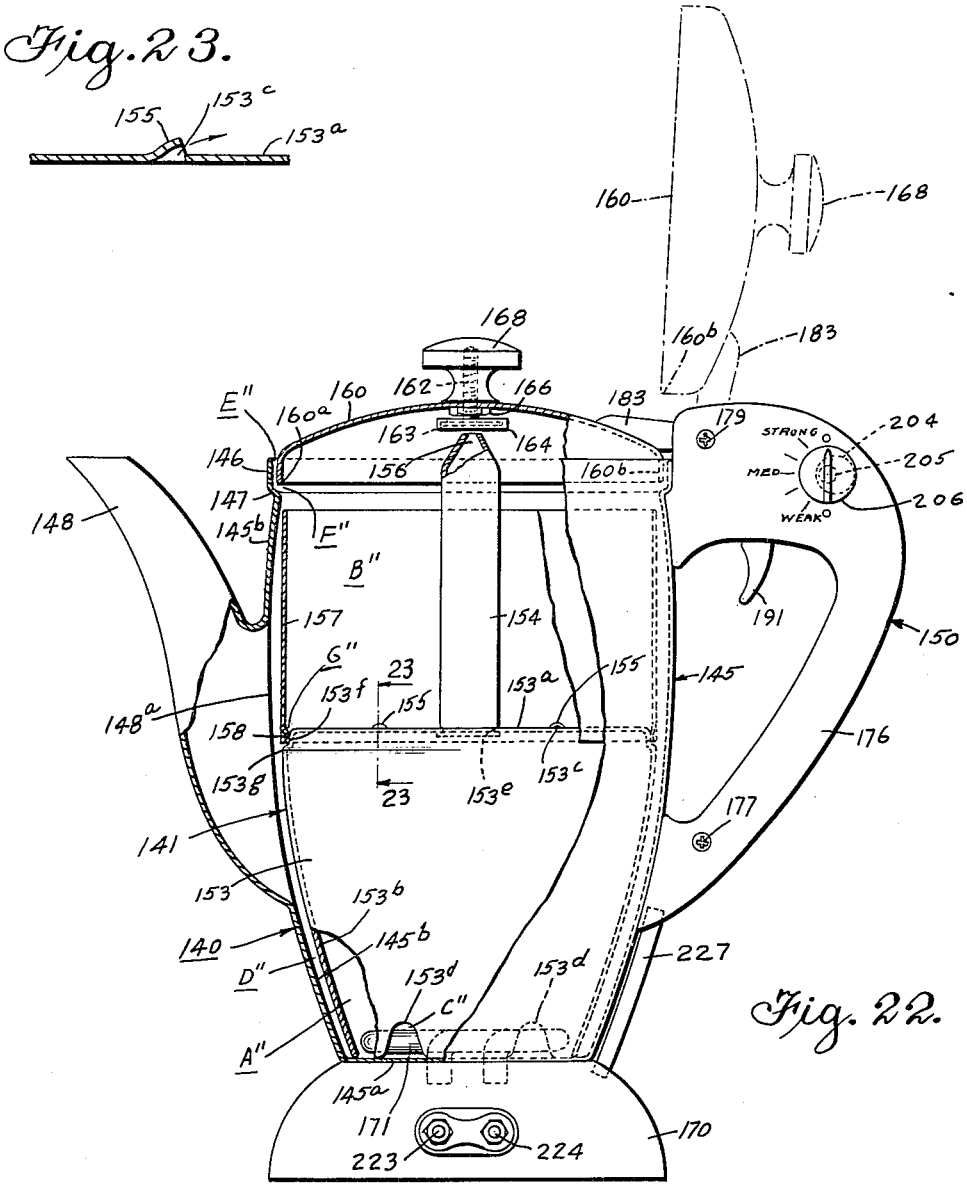
INVENTOR.
James R. Campbell.
BY Knight & Rodgers
ATTORNEYS.

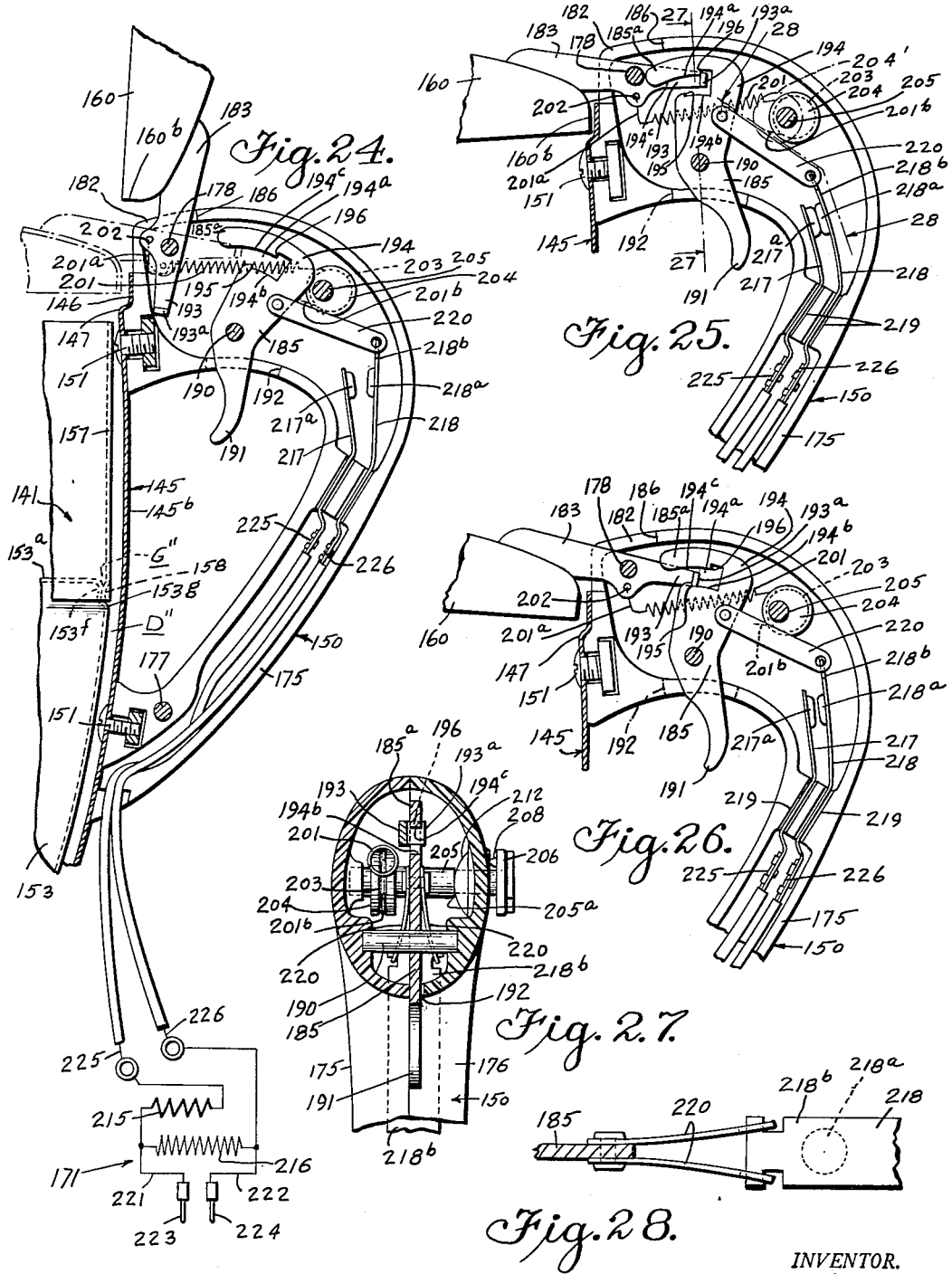

United States Patent Office 2,745,333
Patented May 15, 1956

2,745,333

COFFEE MAKING APPARATUS

James R. Campbell, Laguna Beach, Calif.

Application July 10, 1950, Serial No. 172,884

6 Claims. (Cl. 99—281)

This invention relates to coffee brewers and more particularly to apparatus of the general type having an upper infusion chamber and a lower pressure chamber, and in which water is heated in the lower chamber and transferred therefrom to the upper chamber by steam pressure, the coffee being then infused and brewed in the upper chamber and being thereafter delivered to the lower chamber upon reduction of temperature and pressure therein. While the brewing receptacle according to this invention may be used with any type of heating equipment, the invention also comprises apparatus for automatic control of the brewing operation.

One object of the invention is to provide an improved type of receptacle for coffee brewing and similar operations.

Another object is to provide a coffee brewing receptacle of simple design which is readily assembled and disassembled, convenient to use and easily cleaned, and which may be used either with or without automatic control.

Another object is to provide a coffee brewing receptacle which is inexpensive to manufacture and in which individual parts are readily replaceable without adverse effect upon their operation when assembled for use.

Another object is to provide an automatic coffee brewer which controls the heating means as a direct function of the boiling of the water, without thermal relays or other interposed means, so that the cycle of operation is unvarying, independent of critical thermal adjustments, independent of effects of altitude, and independent of nominal effects of wear or stress relief on actuating parts.

Another object is to provide an automatic coffee brewer which, by virtue of adequate preheat of the grounds prior to infusion, and by virtue of adequate gentle agitation of the infused grounds, provides a more flavorful and aromatic brew without resorting to excessive infusion time which extracts strong and undesirable oils from the grounds.

Another object is to provide for effective control of a cyclic operation in the brewing of coffee so as to obtain a brew of desired strength and to avoid recycling of the brew.

Still another object is to provide an automatic coffee brewer which will automatically control a cycle of operation and which is capable of adjustment to vary the duration or extent of one or more of the steps of the operation.

Still another object is to provide a coffee brewing receptacle having a container for holding water and members insertable therein to provide a lower pressure chamber and a superposed infusion chamber for receiving ground coffee, and in which no gaskets or sealed joints are needed between the members.

Still another object is to provide a coffee brewer having its own heating apparatus with controls for regulating the degree and duration of heat during the stages of the brewing operation.

Another object is to eliminate any danger of breaking or injuring any parts of the brewing receptacle because of excessive superatmospheric pressure therein during the brewing cycle. In this connection, a particular object is to provide a definite limit on the superatmospheric pressure that can develop in the pressure chamber during the heating stage of the brewing cycle, and another particular object is to provide a definite limit on the vacuum that can be created in the pressure chamber when the temperature therein falls below the boiling point.

A further object is to provide a coffee brewer in which the displacement of water from a heated lower chamber in the brewing receptacle to an upper infusion chamber is effected by a limited pressure in the lower chamber, while the filtered return flow of the brewed coffee from the infusion chamber to the lower chamber is effected by gravity, without requiring creation of any subatmospheric pressure in the lower chamber.

Another object is to provide a brewing apparatus in which the infusion of the ground coffee by heated water is effected while the water and the ground coffee are within a desirable temperature range near but several degrees below boiling temperature.

A further object is to provide advantageous means for agitating and heating the water and ground coffee during infusion, by causing a small amount of steam from the pressure chamber to pass upwardly through the infusion chamber in agitating and heating contact with the water and ground coffee therein.

Still another object is to provide a brewing receptacle which is adapted to be easily and conveniently attached to a heating apparatus having means for automatic control of the brewing operation, and which is readily detachable from the heating apparatus for use without automatic control.

Another object is to provide a form of automatic coffee brewer including an outer container rigidly connected to heating apparatus provided with automatic control mechanism.

Still another object is to mount the cover of the brewing receptacle on the heating apparatus for movement away from the receptacle to an inoperative position above the receptacle where any condensate on the cover will drip into the receptacle.

Other objects will be apparent from the detailed description which follows.

In accordance with the present invention the receptacle in which the coffee is brewed comprises an outer container for water having a cover and an inner vessel made up of two parts or members which are assembled in superposed relation and inserted into the container to provide a lower pressure chamber and an upper infusion chamber for receiving ground coffee. When the parts are so assembled, a liquid passage of restricted extent is left within the container between its inner wall and the inner vessel.

In the preferred forms the container and the two inner members are generally cylindrical in shape, providing an annular liquid passage between the inner vessel and the wall of the container. The lower member is shaped somewhat like a bell, with an open lower end and a closed top and side wall or skirt to form the pressure chamber; it has a hollow tubular extension above its closed top to provide a vent passage and also to serve as a handle. The upper member is cylindrical with an open lower end that seats upon the upper end of the lower member to provide an annular infusion chamber for ground coffee around the hollow tubular extension of the lower member and filtering passages for outflow of liquid from the infusion chamber into the annular liquid passage; it has an opening at its upper end for inflow of water from the annular liquid passage. The brewing receptacle is provided with a cover which, when in place thereon, is adapted to engage and seal the vent passage provided by the hollow extension on the lower or bell member. Restricted orifice means are provided in the closed top of the lower member for escape of air and water vapor to insure, on heating the container, that the water therein is boiling before it is forced from the pressure chamber up through the annular liquid passage and into the upper or coffee infusion chamber, and for admitting steam from the pressure chamber into the infusion chamber to agitate and heat water and ground coffee therein. The upper end of the annular liquid passage is open to the atmosphere through an annular opening between the cover and the outer vessel.

Free movement of liquid between the pressure chamber and the liquid passage leading to the top of the inner vessel is effected by notching the skirt of the lower member or by suspending the lower member so that its skirt is above the bottom of the outer container. By making the brewing receptacle parts, or at least the outer container, of transparent material such as heat-resistant glass, the operation of the brewer can be watched and regulated without the use of automatic controls. However, these parts may, if desired, be made of metal or any other suitable material resistant to heat and hot water.

For non-automatic operation, the cover is secured to the top of the outer container by interfitting parts on the cover and the upper rim of the outer container, in position to seal the tubular vent passage and prevent upward movement of the inner vessel.

For automatic operation a suitable stove or heating apparatus having automatic heat control means may be provided. For convenience and by preference the heating apparatus is electrical, and the automatic control means comprises switch means for controlling the electrical heating circuit and a manual control member for initiating the heating cycle.

According to one embodiment, the receptacle described above is removably mounted on the heating apparatus. In this case the heating apparatus comprises a heating base on which the receptacle is placed, and a housing or standard extending upward from the base and in which the heat control means is located. A control arm pivotally mounted on the standard of the heating apparatus swings over the receptacle and is attached to the cover of the brewer, said cover being in this case free to move with said arm relative to the brewing receptacle, and being preferably connected thereto by detachable mounting means. According to another embodiment for automatic operation, the housing receptacle is rigidly secured to the heating apparatus and automatic control means. In this case, the control means is preferably mounted within a suitable handle secured to the outer container and is provided with a pivoted control arm carrying the cover.

When the control arm is in its upper or inoperative position, it holds the cover so that any condensate thereon will drip into the container but permits the inner vessel to be readily removed from the outer container and also permits the receptacle to be removed from the heating apparatus in the first mentioned embodiment.

Suitable latch and control means are provided for the heating apparatus to effect automatic regulation of the brewing operation once the manual control member has been turned to "start" position. Such latch and automatic control means include an escapement on the pivoted control arm which operates on upward as well as on downward movement of the arm resulting from the cycle of movement of the water within the container, causing first a rising and then a falling of the inner vessel which is communicated to the cover of the container by the tubular extension on the lower member of the inner vessel which is engaged and sealed by the cover when the brewing operation is started. Prior to starting, the pivoted control arm is held in a position such that the cover of the container is slightly raised, and the control arm is released to permit the cover to close only when the manual control is moved to "start" position. Movement of the pivoted control arm also controls the operation of switch means to regulate the operation of the heating apparatus. Suitable means are preferably provided for adjusting the resistance to upward movement of the pivoted arm and thereby modifying the strength of the brew which results from the automatic operation.

For a better understanding of the invention reference will now be had to the accompanying drawings which illustrate concrete embodiment of the invention and to the description thereof with particulars as to automatic as well as to non-automatic operation.

In the drawings:

Fig. 3 is an enlarged vertical sectional view of this form of automatic brewer, on the broken line 3—3 of Fig. 2 and showing certain parts in elevation;

Fig. 7 is a detailed horizontal sectional view on the line 7—7 of Fig. 3 showing the means of detachably mounting the cover on the pivoted arm for use in automatic operation;

Fig. 8 is a broken away vertical sectional view on a still larger scale than Fig. 3, showing certain parts of the cover, the pivoted arm and the seal for the vent passage from the pressure chamber, the seal being shown in position to close the vent passage, the cover being shown in position to close the vent passage;

Fig. 9 is a vertical sectional view taken generally on line 9—9 of Fig. 3 showing certain parts in elevation;

Fig. 10 is a vertical section taken generally on the line 10—10 of Fig. 9, but with certain parts shown in elevation, and indicating diagrammatically the heating coils in the electric stove;

Fig. 11 is a vertical sectional view on an enlarged scale on line 11—11 of Fig. 9, with the control arm shown in dot-dash lines;

Fig. 12 is a vertical sectional view on the line 12—12 of Fig. 11, with certain other parts shown in dot-dash lines;

Fig. 13 is an enlarged horizontal sectional view on the line 13—13 of Fig. 9;

Fig. 14 is a detailed sectional view on the line 14—14 of Fig. 9 and on the scale of Fig. 13;

Figure 2:
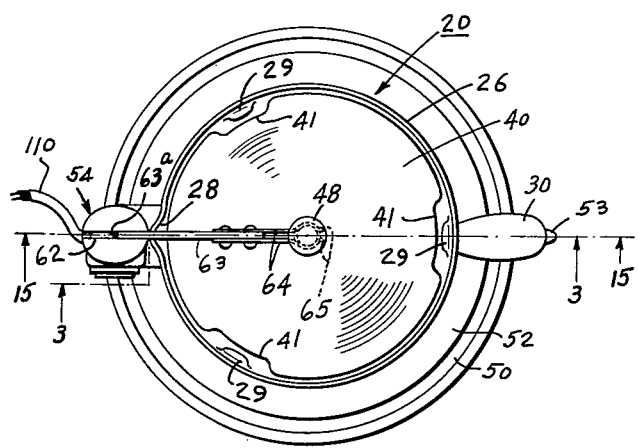
Fig. 2 is a top plan view of an automatic coffee brewer, showing the brewing receptacle of Fig. 1 with the cover in place, mounted on an electric stove provided with means for automatic control of the brewing operation.
Figure 5:
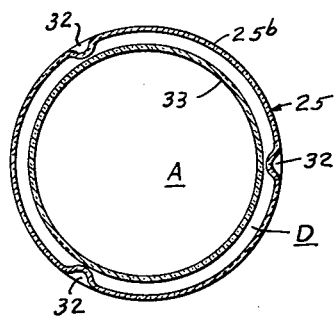
Fig. 5 is a horizontal sectional view similar to Fig. 4 but on the line 5—5 of Fig. 3.
Figure 18:
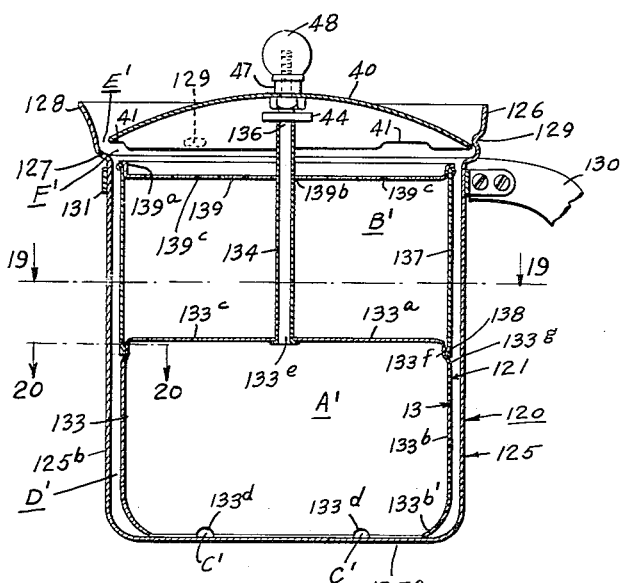
Figure 21:
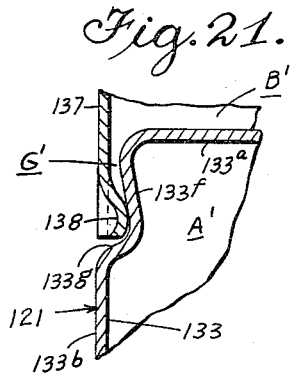
Figure 19:
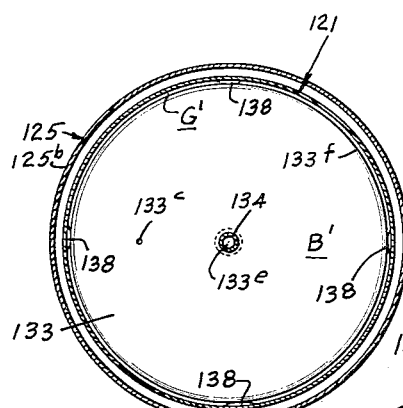
Figure 20:
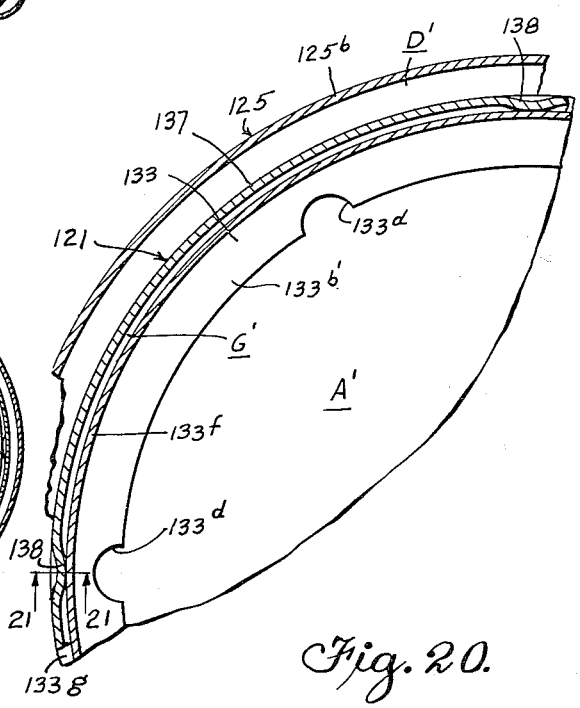

Figs. 15, 16 and 17 are vertical sectional views, on the line 15—15 of Fig. 2 but with certain parts shown in elevation, of the upper portions of the brewing receptacle and the control standard showing the positions of various parts and indicating stages in the automatic control of the brewing operation; Fig. 15 showing the cover closed at the start of the operation with the pressure chamber vent sealed and with heat full "on"; Fig. 16 showing the cover partly lifted by flotation and pressure on the inner vessel, shutting off all heat; and Fig. 17 showing the inner vessel back in its original position with the seal broken on the vent passage and with the low heat coil "on";

Fig. 18 is a vertical sectional view through a modified form of coffee brewing receptacle, the parts of which are preferably formed principally of metal, and illustrating the cover secured to the outer container and sealing the vent passage from the pressure chamber, for use in non-automatic brewing;

Fig. 19 is a horizontal sectional view on the line 19—19 of Fig. 18;

Fig. 20 is a partial horizontal sectional view on an enlarged scale, on the line 20—20 of Fig. 18;

Fig. 21 is a detailed vertical sectional view on a still further enlarged scale, on line 21—21 in Fig. 20, showing the snap engagement of the members making up the inner vessel;

Fig. 22 is a partly sectional side elevation of a modified form of coffee brewer according to this invention (adapted for automatic operation and having the outer container of the receptacle rigidly secured to the heating apparatus and the automatic control means mounted in the handle of the outer container);

Fig. 23 is a partial vertical section on line 23—23 in Fig. 22, showing a modified form of small orifice means between the pressure chamber and the infusion chamber;

Fig. 24 is a vertical section of a portion of this modified form of brewer showing the automatic control means in one position, the heating coils and their connections being shown diagrammatically;

Figs. 25 and 26 are partial vertical sections showing the automatic control means in other successive positions during a brewing cycle;

Fig. 27 is a transverse sectional view of the handle and control means on line 27—27 in Fig. 25; and Fig. 28 is a detail sectional view on line 28—28 in Fig. 25, showing certain parts of the control means.

In the form of apparatus illustrated in Figs. 1 to 17, the coffee brewing receptacle indicated generally at 20 comprises a cylindrical outer receptacle or container 25 for water, of substantial depth, having a bottom wall 25a and a generally cylindrical side wall 25b provided at its upper end with an expanded or flared rim portion 26 which is outwardly flared to form a shoulder 27 over which a cover may extend, the flared rim having a pouring lip 28 and a plurality of angularly spaced inwardly extending dimples 29 for a purpose presently to be described. A handle 30 is secured by a band 31 around the exterior of container 25 beneath shoulder 27 for convenience in moving the brewing receptacle and for pouring from it. The lower portion of container 25 is formed with a plurality of angularly spaced inwardly extending supporting flutes 32. Index marks may be formed in or applied to the side wall of container 25 as shown at 25c in Fig. 1 as guides to the quantity of water needed to make 2, 4, 6, 8 or any desired number of cups of coffee.

The brewing receptacle 20 further comprises an inner vessel indicated generally at 21 which is inserted within container 25 to provide therein, as shown in Fig. 3, a lower or pressure chamber A, a separate upper or infusion chamber B thereabove for ground coffee, and an annular liquid passage D between the inner vessel and the outer container side wall 25b. This inner vessel is by preference made up of two parts; a lower cylindrical member 33 shaped somewhat like a bell, open at its lower end and closed at its upper end by wall 33a to form pressure chamber A therein; and an upper cylindrical member 37 open at both ends and seated upon lower member 33 to form therein, above the closed top of the lower member, the annular infusion chamber B for ground coffee. Member 33 has a cylindrical side wall or skirt 33b, and a central hollow extension or vent tube 34 having a relatively large vent opening 36 at its upper end to provide a vent from chamber A. The tubular extension 34 extends upward from wall 33a through the central portion of the upper chamber B, to and preferably somewhat above the level of the open upper end 37a of the upper member 37, and may have a bulbous enlargement 35 adjacent vent opening 36 for convenience in handling.

Lower member 33 is formed just below its closed end with an annular outwardly projecting bead 38 which provides an upper shoulder 38a on which upper member 37 seats and is supported against lateral displacement, the engaging surfaces of the lower edge 37b of the upper member and shoulder 38a providing restricted filter passage means G therebetween for movement of liquid from infusion chamber B. A lower shoulder 38b, also formed by bead 38, engages the upper portions of flutes 32 on the interior of container 25 so that the inner vessel 21, made up of members 33 and 37, is suspended within container 25 with the lower end of skirt 33b of lower member 33 spaced somewhat above the bottom of container 25 as indicated at C to prevent contact with the bottom wall of the outer container which, in the case of a glass outer container, is undesirable from the standpoint of thermal breakage due to effect of abrasions on the surface transmitting heat to the water. The space provided at C also permits free movement of liquid between chamber A and the restricted annular passage D between container 25 and the inner vessel. When so suspended, the upper edge 37a of the upper member is below the upper edge of the outer container 25 and preferably adjacent but slightly below the outwardly extending shoulder 27. The open upper end of the upper member 37 provides an opening at the top of the inner vessel for overflow of water from the upper end of the annular passage D into the infusion chamber B.

The brewing receptacle is provided with a cover 40, the outer edge of which has cut away portions or notches 41 corresponding in number and placement with the dimples 29 on the flared rim 26 of the container. When the cover 40 has its cut away parts or notches 41 in register with dimples 29, as shown in Figs. 2 and 3, the cover can be lowered into and raised from its closed position without difficulty, but a partial rotation of the cover when closed brings edge portions of the cover beneath dimples 29 (Fig. 6) and it is then locked in closed position until again released by a partial rotation. The diameter of cover 40, between the notches 41, is sufficient to extend over the shoulder 27 of container 25 and to project beneath the dimples 29 for locking it in closed position, but is somewhat less than the internal diameter of the rim portion 26 of container 25 between the dimples, so as to provide an annular space therebetween for outflow of air and water vapor, as indicated at E in Fig. 3.

Figure 6:
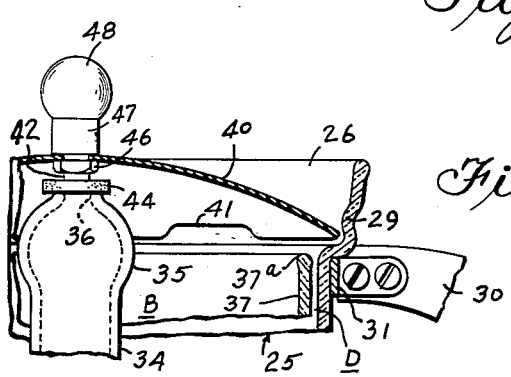
Fig. 6 is a broken away detailed vertical sectional view on an enlarged scale of the upper part of the brewing receptacle, showing the cover secured in closed position on the receptacle sealing the vent passage, for non-automatic operation.

When secured in closed position as described above, cover 40 will seal vent port 36 of pressure chamber A, as illustrated in Fig. 6. For this purpose cover 40 has a central post 42 having at its lower end a head or flange 43 on which is mounted a sealing disc 44 of suitable resilient material not adversely affected by moisture and heat (such as certain types of synthetic rubber) in position to engage the bulbous end 35 of hollow extension 34 around vent opening 36 (Fig. 6). The central portion of the lower face of head 43 is recessed or undercut as indicated at 45 (Fig. 8) to provide a cushioning space across which sealing disk 44 is stretched so that there can be some relative vertical or angular movement of the inner vessel or of the cover without breaking the seal on vent opening 36. Post 42 has a nut 46 thereon to engage the under surface of cover 40, a spacing sleeve 47 to engage the upper surface of cover 40 and a threaded knob or acorn nut 48 at its upper extremity. Adjustment of the position of sealing disk 44 is effected by changing the position of nut 46 on post 42 and making a corresponding change in the position of knob 48. The vertical adjustment of sealing disk 44 relative to the cover 40 is such that when said disk is in sealing engagement with the upper end of extension 34 the outer edge portion of the cover is spaced somewhat above the shoulder 27 of container 25. This permits tight sealing engagement of disk 44 with theh extension 34 and also provides an annular space therebetween for outflow of air and water vapor, as indicated at F in Fig. 15. The cover 40 is also spaced upwardly from the upper edge 37a of the inner vessel so as not to obstruct flow of water from the top of the annular passage D into the open upper end of infusion chamber B.

While the parts of the brewing receptacle 20 may be made of any suitable or desired materials, the receptacles including container 25 and the inner members 33 and 37 are advantageously made of transparent heat resistant glass enabling the operation and conditions of the brewing to be observed. This is particularly advantageous when the brewer is used without any automatic regulation. Cover 40, which is out of direct contact normally with the liquids or has limited contact with them, can be of metal.

Figure 4:
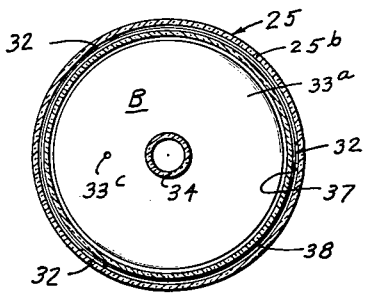
Fig. 4 is a horizontal sectional view on the line 4—4 of Fig. 3, through the brewing receptacle alone and on the scale of Fig. 1.

To insure that the water will be boiling in container 25 before it is forced out of pressure chamber A up into infusion chamber B, restricted orifice means in the form of a small pressure release or relief port or hole 33c of the order of 1/16" diameter is provided in the upper closed wall 33a of the bell member 33 (Figs. 3 and 4). This port is of such size as to permit escape of air and water vapor from chamber A and relieve the pressure therein until the water is actively boiling and also to permit escape of a small amount of steam therethrough during the infusion of the coffee, but to so restrict the rate of outflow of steam under conditions of active boiling as to create and maintain a superatmospheric pressure therein sufficient to displace the water upwardly into the infusion chamber. The port 33c is relatively small compared with vent opening 36.

Figs. 2, 3 and 9 through 17 show heating apparatus and control means adapted for use with the above described brewing receptacle and for the automatic control of the brewing operation. An electric heater is preferred but it is to be understood that the principles of operation can be applied to other types of heating equipment. As shown in Fig. 3 the heater has a base 50 of conventional type supporting a recessed heated plate 51 of porcelain or other suitable refractory material in which the electric heater coils are mounted and upon which the brewing receptacle is removably supported. The stove base has an ornamental and heat baffling enclosure 52 having a handle 53 at one side and a standard or support 54 fixedly secured to the opposite side and extending somewhat above the upper rim 26 of container 25 when the latter rests upon plate 51. The support standard 54 may comprise a housing formed of two complementary housing members 55 and 56 of plastic or other suitable insulating material held together by suitable means such as a lower bolt 57 and an upper pivot pin 58 having threaded bore portions in its ends receiving machine screws 59 (Fig. 9). Assembled within standard 54 is the control equipment presently to be described. Members 55 and 56 forming the assembled standard are each secured to enclosure 52 of the stove base by screws 60 (Fig. 3) received in threaded openings 61 in said members (Figs. 9 and 10).

Pivotally mounted on pivot member 58 for limited swinging movement through a slot 62 at the top of standard 54 is a control arm 63 having complementary flat spring members 64 secured to opposite sides of its free end and extending beyond the end of the arm to form a spring clip, the outer ends of members 64 being oppositely bent at 65 (Figs. 3, 7 and 8) to form a socket to grip spacing sleeve 47 on cover 40 and releasably to secure the cover 40 to arm 63 for movement with the latter. When in fully lowered position arm 63 disposes cover 40 in closed position to seal vent 36 as described above (Figs. 8 and 15) and, when arm 63 is fully raised by angular movement about pivot member 58, to bring shoulder 63a thereon against stop shoulder 66 at the end of slot 62 (to the dot-dash line position shown in Figs. 3, 10 and 17), the lower edge of cover 40 overhangs the flared rim 26 of container 25 sufficiently (Fig. 3) so that any condensate on cover 40 will drip into container 25. With arm 63 in this raised position there is free access to the brewing receptacle 20. It can be placed on stove 50 and removed therefrom to pour the coffee when desired, and the inner vessel 21 can be inserted in and removed from the outer container 25 while the latter is left on the stove, if desired.

Angular movement of the pivoted control arm 63 is arranged to actuate suitable control mechanism mounted in standard 54 which regulates automatically the heat of the stove and resulting movement of the water in the brewing receptacle, and also controls the closing and opening of the vent opening 36, the movement of the arm being controlled in part by such control mechanism and in part by movement of the inner vessel of the brewing receptacle during the brewing operation. Below and parallel with pivot 58 is a control shaft 70 which is rotatably and slidably supported by housing members 55 and 56 and projects through the forward member 56, and which is manually movable by a control knob or button 71 secured to the forwardly projecting end of the shaft, by which it may be rotated, contrary to the urging of a coil spring 72 (Fig. 9), in a clockwise direction of rotation as viewed in Figs. 3, 10, 11, 15, 16 and 17, i. e., in the same rotative direction as downward swinging movement of arm 63. Spring 72 biases shaft 70 to rotate it in the opposite or counterclockwise direction and also biases it outwardly or forwardly, i. e., toward the right in Fig. 9, shaft 70 being arranged for limited movement inwardly against the outward pressure of coil spring 72 which engages knob 71 at its outer end and the housing member 56 at its inner end. Outward movement of the shaft is limited by a split ring 70a seated in a groove in the shaft and bearing against the inner face of member 56.

Shaft 70 carries a pawl 73 engageable with an escapement or latch device 74 attached to or forming a part of and movable angularly with arm 63, to resist and limit counterclockwise rotation of shaft 70 by spring 72 while permitting rotation of the shaft in the opposite direction by means of knob or button 71 when arm 63 is in a lowered position. As shown in Figs. 10, 15, 16 and 17, and in dot-dash lines in Fig. 11, escapement 74 has a concave lower edge 74a of generally arcuate curvature about an axis which is located adjacent the axis of shaft 70 when the control arm 63 is in a lowered position, so as to permit the desired rotative or angular movement of pawl 73, and said lower edge 74a is provided with two spaced latch shoulders 75 and 76, each of which is arranged to engage and hold pawl 73 in certain positions of arm 63 (see Figs. 16 and 15). A notched edge portion or stop shoulder 74b at the lower edge of the escapement beyond (to the right of) shoulder 76 is also adapted to be engaged by the off-set end 77a of a stop pawl 77 mounted for pivotal movement on pivot 78 on housing member 55 (Figs. 9–12 and 15–17) and yieldingly urged into operative position for such engagement by a leaf spring 79 (Figs. 11 and 12) secured to housing member 55. Spring 79 biases pawl 77 in a clockwise direction in Fig. 11, movement of the pawl in that direction being limited by a stop shoulder 79a on housing member 55, whereby said pawl is normally maintained in its operative position to engage the stop shoulder or notch 74b of escapement 74 when arm 63 is lowered. Pawl 77 does not interfere with upward movement of arm 63 but stops the arm as it is lowered, at an initial position somewhat above the limit of its downward movement (Figs. 10, 11 and 17), at which position cover 40 is slightly above closed position and sealing member 44 is out of sealing contact with vent 36 (Figs. 3 and 17). When manual control knob 71 is turned in a clockwise direction to "start" position, with the arm and cover in this intermediate position, pawl 73 is moved beyond shoulder 76 and beneath notch 74b, displacing pawl 77 from beneath said notch (as shown in Fig. 15 and in dot-dash lines in Fig. 11) and permitting arm 63 and cover 40 to fall to closed position thus sealing the vent opening 36 (Figs. 8 and 15).

Arm 63 and cover 40 move downwardly under the combined action of gravity and the pull of a tension spring 81 which is connected to arm 63 by an off-set link 82. Link 82 is pivotally connected to control arm 63 by a pivot pin 82a which moves past dead center when the arm moves from lowered to raised position so as to retain the arm in upright position with shoulder 63a resting against stop 66 (see the dot-dash line position of the parts in Fig. 10). When the arm 63 is lowered, the pivot pin 82a moves to the right of dead center and the downward pull of spring 81 acts with the force of gravity to urge the arm and cover downward toward closed position.

The lower hooked end of tension spring 81 seats in an annular groove 83 in an eccentric tension-adjusting disk 84 whose shaft 85 extends rotatably and slidably through a bearing in housing member 56 (Figs. 9, 10, 13 and 14) and has a manual adjusting knob 86 secured thereto and provided with a pointer 86a (Fig. 3) movable over a series of positioning depressions 87, the pointer carrying a rounded projection 88 on its inner side (Fig. 9) to seat in any one of the depressions 87, whereby adjustment can be made in the pull of spring 81 on arm 63. It will be evident that a half rotation of knob 86 and shaft 85 from the position shown in Figs. 3, 9, 10 and 14 will move eccentric disk 84 to the dot-dash position in Fig. 14 and thus decrease the tension in spring 81, whereby the strength of the brew may be controlled as described hereinafter. Shaft 85 has a bearing socket 89 at its inner end rotatably and slidably journalling the shaft on the forward end of a bearing pin 90 extending through an insulating block 91 and threadedly secured to housing member 55 (Figs. 9 and 13). A dished spring element 92 between the inner face of housing member 56 and a shoulder 85a on shaft 85 urges the latter toward inward bearing pin 90 and holds projection 88 on adjusting knob 86 in the chosen positioning depression 87. A split ring keeper 93 may be provided on shaft 85 to limit inward movement thereof.

Referring again to Fig. 15, a short upward movement of control arm 63 from the position shown there, as to the position shown in Fig. 16, will lift latch shoulder 76 of the escapement 74 sufficiently to release pawl 73 and will also bring the shoulder 75 into the path of movement of said pawl. Pawl 73 will then be rotated counterclockwise by spring 72 until it engages shoulder 75 of the escapement, where said pawl is held in engagement with said shoulder and with the lower edge 74a of the escapement so as to latch the pawl against further counterclockwise movement and also latch the control arm 63 against further upward movement. Meanswhile pawl 77, 77a will have been restored to its position against stop shoulder 79a (Fig. 11) and beneath notch 74b by action of its spring 79. The parts are shown in this position in Fig. 16.

A slight downward movement of control arm 63 from this position, as to the position shown in Fig. 17, will release pawl 73 from latch shoulder 75 and cause it to again move counterclockwise, and will return notch or stop shoulder 74b to its initial position of engagement with stop pawl 77, 77a to limit such downward movement. On release from shoulder 75, pawl 73 will be again moved counterclockwise by spring 72 and control shaft 70 to the position shown in Fig. 17, in which it engages an intermediate stop pin 94 projecting from housing member 56 (see also Figs. 9, 11 and 12), from which it may be released by inward pressure on manual control knob or button 71 to move shaft 70 longitudinally sufficiently to enable pawl 73 to clear pin 94. Pawl 73 will then again be moved counterclockwise by spring 72 and will come to rest against final stop pin 95, which as shown is longer than stop pin 94. This returns the manual control knob 71 to its initial "off" position.

Shaft 70 also carries a cam 100 to control the heating coils of the electric stove. As diagrammatically shown in Fig. 10 the stove has a high heat or high wattage coil 105 of low resistance and a low heat or low wattage coil 106 of high resistance connected in parallel for control by a three-position switch mounted in standard 54, these coils being mounted in the above mentioned recessed heater plate 51. The switch consists of three parallel leaf-spring switch members 107, 108 and 109 mounted on an insulating support 95a on housing member 55 and held in place by an insulating plate 91, and provided with contact points at their free ends (Figs. 9, 10 and 15–17). Plate 91 may be held in position by a flange or nut portion 90a on bearing pin 90. One ouside switch member 107 has its fixed end connected by wire 107' to the high heat coil 105 while the other outside switch member 109 is connected by wire 109' to the low heat coil 106 and has an extension or finger 109a extending beyond its contact point into the path of movement of cam 100 (Figs. 9, 10 and 15–17). The central switch mmeber 108 is connected by wire 108' to one side of the electric supply circuit which is brought to the stove by a cable or extension cord 110 leading to standard 54. The other side of each heating coil is connected by wire 111 to the other side of the supply circuit.

Cam 100 is located rearward of pawl 73 and beyond the ends of stop pins 94 and 95, and has two switch actuating projections 101 and 102 of differing radius, projection 102 being of greater radius than 101. The portions of cam 100 intermediate projections 101 and 102 are of too short radius to engage extension 109a of switch member 109. When manual control knob 71 and control shaft 70 are set at "start" position with pawl 73 engaging escapement shoulder 76, projection 102 engages said extension 109a (Fig. 15) and displaces or bends switch member 109 toward members 107 and 108 to such an extent that the contact points on all three of these switch members are in contact with one another and the electric current passes through both heating coils 105 and 106 to apply "high" heat. When the control shaft 70 is in its second position with pawl 73 engaging escapement shoulder 75 (Fig. 16) or in its initial and final "off" position with pawl 73 engaging stop pin 95 (Figs. 10 and 11), extension 109a is not engaged by cam 100 and no current flows through either of the heater coils. In the third position of control shaft 70 and control knob 71, with pawl 73 engaging stop pin 94 (Fig. 17), projection 101 is disposed in contact with extension 109a to bend switch member 109 only sufficiently to bring its contact point into engagement with the contact point on switch member 108 to close only the circuit through low heat coil 106.

Figs. 18–21 show a modified form of brewing receptacle indicated generally at 120, in which all the receptacle parts are preferably made of metal. As before the receptacle includes an outer container 125 and an inner vessel 121, whose general form and relative arrangement are similar to those above described except for the differences in shape and construction shown in the drawings and noted below. As shown, cylindrical outer container 125 has a bottom wall 125a and a cylindrical side wall 125b without flutes, but at its upper end is fashioned similarly to the first form of the invention with an expanded or flared rim portion 126, flared to form an outwardly extending shoulder 127 over which the cover 40 extends when in closed position, in the same manner as described above. Rim 126 has a pouring lip 128, and inwardly extending dimples 129 which are avoided when applying the cover 40 by the cut-away portions or notches 41 on the edge of the cover, but are utilized to secure the cover in closed position by a partial rotation of the cover as previously described. Annular spaces E' and F' are again provided for outflow of air and water, between the edge of cover 40 and the flared rim 126, and between the edge of said cover and shoulder 127. The cover 40 and associated parts may be the same as described above, said cover being provided with a resilient sealing member 44, a sleeve 47 for attachment to the control arm 63 for automatic operation, and a knob or handle 48. A handle 130 may be attached to container 125 by a band 131 as in the first form.

The inner vessel of the brewing receptacle, indicated generally at 121, is made up of two parts, providing as before a pressure chamber A' and an infusion chamber B'. The lower part is a cylindrical or bell-shaped member 133 with its lower open end somewhat constricted, the lower end portion of the side wall or skirt 133b being inwardly bent as at 133b' (Fig. 18) to conform generally to the rounded configuration of the lower part of container 125. In this form, the lower member 133 rests upon the bottom of container 125 and the lower edge of its skirt is suitably recessed, notched or slotted as at 133d to provide openings C' permitting free movement of liquid between pressure chamber A' and the annular liquid passage D' provided between the inner vessel and the interior of container 125. The closed top wall 133a of lower member 133 has a central opening 133e communicating with the lower end of a small cylindrical vent tube 134 integral with member 133 or tightly attached thereto in a suitable manner as by crimping, extending upward and having at its upper end a vent opening 136 in position to be sealed by sealing disk 44 on cover 40 as previously described. At its upper closed end member 133 is reduced in diameter as at 133f for a short distance vertically to form an annular shoulder 133g. Restricted orifice means in the form of a small pressure relief hole or port 133c, comparable to port 33c above, is provided in the top wall 133 of member 133 to insure that water will boil in pressure chamber A' before sufficient pressure is built up to force it out and up the annular passage D' around the inner vessel. This port 133c also permits limited escape of steam through the infusion chamber during infusion of the coffee therein. It is relatively small compared with vent opening 136.

The open ended upper cylindrical member 137 of the inner vessel, which seats upon lower member 133 to provide infusion chamber B' around hollow extension 134, is of substantially the same diameter as member 133 so that its lower end will telescope over the reduced upper end 133f of member 133. To facilitate handling of the inner vessel as a unit, the parts are preferably adapted for frictional engagement with each other when assembled. For this purpose, for example, the lower end of member 137 is formed with several evenly spaced indentations 138 which grip the reduced diameter portion 133f of lower member 133, so that the two members engage each other with a snap action and are maintained in assembled relation until pulled apart. The reduction in diameter of portion 133f and the slope of shoulder 133g of lower member 133 are computed so that, when member 137 is mounted on member 133 at the limit of telescoping engagement and with indentations 138 in contact with the upper portion of shoulder 133g (Figs. 20 and 21), an elongated filter passage G' of suitable dimensions, will be provided between the spaced wall portions 133f and 137 of the two members for outflow of liquid from infusion chamber B. The spacing between the two opposing wall portions 133f and 137, at the filter passage G', is relatively small so as to provide one transverse dimension that is sufficiently small to prevent movement of coffee grounds therethrough, for example, of the order of 1/32". The other dimension of the filter passage, transverse to the direction of flow of liquid therethrough, is determined by the circumference of the two members and the number and size of the indentations 138, and is relatively large so as to provide a filter passage of adequate cross-sectional extent for gravity filtration of liquid at a reasonable rate of flow. I have also found that, for effective filtration and prevention of escape of coffee grounds, it is advantageous to provide a filter passage of substantial length in the direction of liquid flow. The spaced wall portions 133f and 137 are therefore preferably formed so as to be substantially equally spaced from each other for a substantial length, such as about 1/8" or more, in the direction of liquid flow through the passage G', so that said passage is relatively elongated in the direction of fluid flow as well as in one direction transverse to the fluid flow. As shown in Figs. 19 and 20, the indentations 138 insure uniform spacing of the telescoped portions of members 133 and 137 and the provision of a filter passage of substantially equal transverse dimensions at all points. Fig. 20 illustrates the greater size of the liquid passage D' between container 125 and the inner vessel 121 as compared with that of the filter passages G' between the telescoped portions of members 133 and 137.

If desired, the inner vessel 121 may also be provided with a perforated inner cover or lid 139 which may be detachably secured to the top of the upper member 137 by means of an upturned peripheral flange portion 139a frictionally engageable within the open upper end of member 137. The inner cover 139 extends horizontally across the top of the infusion chamber B', being provided with a central opening 139b through which vent tube 134 extends, and a plurality of small perforations 139c distributed over its entire horizontal area to provide an opening at the top of the inner vessel for inflow of water to the infusion chamber B' and escape of water vapor therefrom. This inner cover prevents possible displacement of ground coffee from the infusion chamber as a result of agitation of the coffee and water therein during the brewing operation, and also retains the coffee grounds if the inner vessel is left in position during pouring of the brewed coffee. It will be understood that a similar inner cover may also be provided in conjunction with the other forms of brewing receptacle disclosed herein, if desired.

*Automatic operation*

Figure 1:
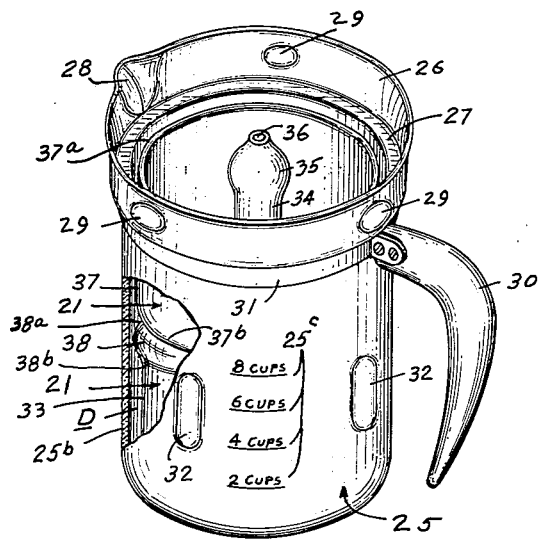
Fig. 1 is a perspective view of a coffee brewing receptacle preferably formed principally of glass, with the cover removed and the outer container partly broken away.

Either form of brewing receptacle, namely, the glass receptacle 20 of Fig. 1 or the metal receptacle 120 of Fig. 18, may be utilized in an automatically controlled brewing operation in conjunction with the above described heating apparatus and control means. For such use, the cover 40 of the brewing receptacle is attached to control arm 63 by sliding the stem or spacing sleeve 47 between spring members 64 until it snaps into the socket formed by the bent portions 65. The cover is turned about its axis to a position in which the notches 41 register with the dimples 29 on container 25 (Figs. 2 and 3) so that the cover is movable into and out of closed position by downward and upward swinging movement of arm 63.

The procedure is as follows:

Put the required amount of water in outer container 25 or 125.

Assemble the inner vessel members 33, 37 or 133, 137 and use vent tube 34 or 134 as a handle to insert the assembled inner vessel 21 or 121 in container 25 or 125, putting the desired quantity of ground coffee in infusion chamber B or B' either before or after insertion.

Place the brewer on heating plate 51 of the electric stove, with the manual control knob 71 in the "off" position, the cover 40 being raised preferably to its upright position above standard 54. (If desired, the outer container may be first placed on the stove and the inner vessel then mounted therein.)

Lower the control arm 63 and cover 40, adjusting the latter if necessary so that cut-away portions 41 register with dimples 29 as described above. Parts are now positioned as shown in Figs. 3, 10, and 11, the cover being held with sealing member 44 slightly above the vent opening 36 since stop pawl 77, 77a engages notch or stop shoulder 74b on escapement 74 and limits downward movement of arm 63.

To start the automatic brewing operation, press manual control knob 71 in (so that pawl 73 will clear stop pin 94) and rotate said knob and control shaft 70 clockwise to "Start" position. Pawl 73 on control shaft 70 moves pawl 77, 77a out of engagement with escapement 74; arm 63 falls by gravity and the action of spring 81, causing cover 40 to move to closed position with resilient disk 44 sealing the vent passage from pressure chamber A or A'; also shoulder 76 on escapement 74 drops over the end of pawl 73 to hold the pawl 100 and manual control knob 71 in high heat position (Fig. 15) with cam projection 102 displacing extension 109a to close the circuit to both coils 105 and 106 of the stove.

From this point control is automatic. As the water heats, pressure rises in chamber A or A' but is partly relieved by escape of air and vapor through small relief port 33c or 133c until the water boils. When the water in the brewer boils, the excess pressure accumulated in pressure chamber A or A' displaces the water therefrom through space C or openings C' and causes it to rise in the passage D or D' around the inner vessel 21 or 121 and flow into the infusion chamber B or B'. Some of the displaced water may overflow upper member 37 or 137 into infusion chamber B or B' and some water also flows into the infusion chamber through the filter passages G or G' between the members making up the inner vessel. The proportion between overflow and filter passage flow is largely dependent upon the wattage of the heating means and consequent degree of activity of boiling, and upon the cross-sectional area of the filter passage G or G'. Displacement of a predetermined quantity of the water from the pressure chamber A or A', as determined by the setting of adjusting knob 86 to adjust tension of spring 81 (for controlling strength of brew), makes inner vessel 21 or 121 buoyant and it rises, taking cover 40 and control arm 63 up with it, to the position shown in Fig. 16.

The rising movement of the inner vessel disengages latch shoulder 76 of escapement 74 from pawl 73 and the pawl rotates counterclockwise until it engages latch shoulder 75 and is stopped, with cam 100 and other parts in the no-heat position of Fig. 16. Pawl 73 now locks arms 63 and cover 40 against any further upward movement due to engagement thereof with the lower edge 74a of the escapement 74, while stop pawl 77, 77a moves back to its original position beneath notch 74b of escapement. Due to the continued buoyancy of the inner vessel holding it in the raised position of Fig. 16, the vent opening 36 remains sealed by disk 44. Since cam 100 is out of engagement with finger 109a, there is no current flow through either of the heating coils. However, the residual heat in the heating plate 51 is sufficient to keep the water boiling until the displacement of water from pressure chamber A or A' is substantially completed and water vapor escapes therefrom.

When the water is substantially all displaced from pressure chamber A or A' and the pressure therein falls due to escape of water vapor beneath the lower edge of the inner vessel and the reduction in temperature following the shutting off of the heater, the inner vessel falls to its original position within the outer container. Arm 63 and cover 40 can move downwardly only until notch 74b of escapement 74 engages stop pawl 77, 77a, so that the inner vessel falls away from cover 40, thus breaking the seal over vent port 36 (Fig. 17) or 136 and releasing any remaining pressure in chamber A or A'. At the same time pawl 73 is released from shoulder 75 of escapement 74 and moves counterclockwise until it engages stop pin 94 at which time cam projection 101 displaces extension 109a sufficiently to make contact between switch members 108 and 109 and close the circuit through the low heat coil 106.

Cover 40 can now be raised whenever desired, since pawl 73 is out of the path of movement of escapement 74. The brewed coffee in infusion chamber B or B', resulting from contact of the hot water with the ground coffee therein, now flows by gravity through the filter passages G or G' between the upper and lower members of the inner vessel and through small relief port 33c or 133c back into the lower part of container 25 or 125. When the brewed coffee has been entirely filtered, container 25 or 125 is removed from the stove and coffee can be poured with or without removing the inner vessel.

To shut off all heat, the manual control knob 71 may be pressed inwardly so that pawl 73 can again clear stop pin 94. Spring 72 will then rotate shaft 70 counterclockwise until pawl 73 engages final stop pin 95, at which time the parts are in the positions shown in Fig. 10.

It will be seen that if the downward pull of tension spring 81 is increased by rotation of adjusting knob 86 toward the position shown in Fig. 3, as described above, a longer heating period will be required to cause displacement of the necessary amount of water from the pressure chamber A or A' to make the inner vessel sufficiently buoyant to rise against the increased downward force exerted thereon by control arm 63. Consequently, the brewing receptacle and the electric heater will be heated to a higher temperature before the inner vessel rises to the position shown in Fig. 16 to shut off the heat, and the increased residual heat stored therein will cause the infusion of the coffee in the infusion chamber B or B' to continue for a longer period thereafter before the pressure in the pressure chamber decreases sufficiently to permit the inner vessel to fall by gravity to its lowermost position (Fig. 17) and break the seal at vent opening 36 or 136. Such adjustment will therefore cause an increase in the strength of brew due to the longer infusion period before the brewed coffee starts to flow back into the lower part of the receptacle.

When the parts are in the "low heat" or warming position shown in Fig. 17, the low heat coil provides sufficient heat to keep the filtered coffee in the lower part of container 25 or 125 at the desired temperature for use. However, since the vent 36 or 136 is open, no pressure can be created in chamber A or A', thus eliminating any possibility of "recycling" by further displacement of the brewed coffee into the infusion chamber. At any time desired, with the parts in this position and the brewing receptacle 20 or 120 remaining on the stove, the heat can be shut off entirely by pressing the manual control knob in as described above, and the low heat coil can be reenergized to warm the coffee by pressing said knob in, rotating it clockwise to return it to the low heat position of Fig. 17, without disturbing the contents of the receptacle or the position of cover 40.

It will be noted that since vent opening 36 or 136 is open to the atmosphere after the inner vessel falls to the position of Fig. 17, no subatmospheric pressure is created in the lower chamber A or A' and the filtered flow of coffee from the infusion chamber into the lower part of the receptacle is effected entirely by gravity.

It will also be noted that when the control arm 63 is raised to its upright position over the standard 54, as is required to remove the brewing receptacle from the stove, any condensed liquid that may drip from the cover 40 will fall within the flared upper rim portion 26 or 126 of the outer container. Also, when the control arm is in this raised position, as indicated in dot-dash lines in Fig. 10, it will be seen that a portion of said arm extends below the pivot pin 58 and projects below the normal operative position of escapement 74 and in the path of clockwise angular movement of pawl 73, thus limiting the possible clockwise movement of said pawl and preventing rotation of manual control knob 71 to the "start" or high heat position while still permitting movement thereof between the "off" and low heat or warming positions.

*Non-automatic operation*

Either of the above forms of brewing receptacles 20 or 120 may also be used for non-automatic operation in the brewing of coffee without the use of the above described heating and automatic control means. In this case the cover 40 is of course not attached to the control arm 63, and the operation is as follows:

Put water in container 25 or 125, assemble inner vessel 21 or 121 and insert in container, putting ground coffee in infusion chamber B or B'. Put cover 40 on the container and lock it in closed position by a partial rotation which will dispose the rim of the cover below dimples 29 or 129, as in Figs. 6 and 18. The vent port 36 or 136 for pressure chamber A or A' is now sealed by sealing disk 44 on the cover 40.

Heat container 25 or 125 on any type of heating equipment until the water boils and the pressure accumulated in chamber A or A' displaces the water up through annular passage D or D', over the upper edge of the inner vessel, and into infusion chamber B or B'. This heating may be continued until the desired strength of brew is attained.

Remove the brewing receptacle from the heat. If cover 40 is left closed, sealing vent opening 36 or 136, the brewed coffee will flow by gravity from infusion chamber B or B' through the filter passages G or G' and be drawn by vacuum into pressure chamber A or A'; some will also be drawn by vacuum through relief port 33c or 133c. If the cover 40 is removed, to uncover the vent opening 36 or 136, return flow of brewed coffee is entirely by gravity, as in the case of automatic operation.

From the above it will be apparent that the present invention provides apparatus capable of automatic as well as non-automatic use for coffee brewing and similar operations. By making the inner vessel of the brewing receptacle in two parts cleaning is easier and filter passages of adequate extent and distribution are provided by the mere assembling of the two parts. When the upper and lower members are made of glass with the upper cylinder resting on an annular shoulder on the lower member, the slight unevenness in the surfaces of the engaging parts which occurs in ordinary manufacture has been found to give an excellent filtering effect so that special machining or treatment of the engaging surfaces is not necessary. Forming an annular bead at the top of the lower member with its double function of supporting the upper member and of supporting engagement with flutes on the inner walls of the outer container is advantageous since it is not necessary to provide apertures in the skirt of the lower member for free movement of liquid out of the pressure chamber and ill effects of abrasion on highly heated glass parts are eliminated. It will be apparent however, that either of these means of supporting the inner vessel and providing for outflow of water therefrom may be employed with either glass or metal parts. Telescoping and snap engagement of the metal parts for the inner vessel in the second form of apparatus permits accurate determination of the filtering passages as well as the maintenance of these parts in assembled relation for handling. The cover or lid arrangement with means for locking the cover in closed position so as to seal the vent passage from the pressure chamber enables the brewing receptacles to be used successfully when automatic control apparatus is not available, and the spring clip on the pivoted arm for quick engagement with the cover makes transition between automatic and non-automatic operation easy and simple. The automatic control mechanism includes an adjustment for varying the strength of the brew by changing the tension of the spring for the pivoted arm to which the cover of the brewing receptacle is attached. When the arm is in elevated position it supports the cover in overhanging relation with the container so that condensate on the cover will drip into the container. The stop pawl 77, 77a on the fixed standard attached to the stove prevents complete closing of the cover except when the manual control knob is in start position to apply high heat. Thereafter upward movement of the inner vessel caused by the boiling of the water in the container raises the pivoted arm to shut off all heat until the inner vessel falls causing some downward movement of the arm until the stop pawl is again effective, at which time the stove operates at low heat until inward pressure on the control knob causes it to be moved to "off" position.

During the infusion stage in either automatic or non-automatic operation, a limited amount of steam escapes from the pressure chamber A or A' through the small pressure release port 33c or 133c and rises in the form of bubbles through the water in the infusion chamber B or B'. These rising steam bubbles promote the infusion of the coffee by causing agitation of the water and ground coffee and also by imparting additional heat thereto.

The vent tube 34 or 134 provides for outflow of air from the pressure chamber and for inflow of air thereto when the inner vessel is being inserted in or removed from the outer container while the latter contains liquid.

Figs. 22 through 28 illustrate a modified form of automatic coffee brewing apparatus in accordance with this invention, in which the outer container of the brewing receptacle is rigidly secured to the heating means, and the automatic control means is mounted in a handle attached to the outer container. It will be apparent from the following description that most of the above mentioned advantageous features of the previously described forms of apparatus are also embodied in this form. In addition, it has the particular advantage that the entire apparatus including the brewing receptacle, the heating means, and the automatic control means can be handled as a single assembled unit.

Referring particularly to Fig. 22, the brewing receptacle indicated generally at 140 comprises an outer container 145 of substantial depth, and an inner vessel 141 inserted therein and providing a lower pressure chamber A'', an upper infusion chamber B'', and an annular liquid passage D'' between the inner vessel and the outer container and extending from the bottom to the top of the inner vessel. These parts are preferably formed of metal, and are of generally cylindrical shape. For the sake of appearance, however, some departure from cylindrical form as viewed from the side may be desirable, and I have shown the side walls of the outer container 145 as having a slight convex curvature in side elevation, the upper and lower ends being of somewhat smaller diameter than the intermediate portion. In order to conform approximately to the curvature of the outer container, the lower end of the inner vessel is also of somewhat reduced diameter.

The outer container has a bottom wall 145a and a side wall 145b provided with a flared upper end or rim portion 146 forming an outwardly extending shoulder 147. A pouring spout 148 is secured to one side of the outer container, communicating with the interior thereof through an opening 148a at a position intermediate the height of the container. The open upper end of spout 148 extends above the upper end of the inner vessel 141, preferably to about the same level as the upper rim 146 of the outer container. A handle 150 for use in lifting and moving the apparatus and for pouring coffee therefrom is secured to container 145 at the side opposite the spout 148, as by means of bolts 151 at the upper and lower ends thereof (Fig. 24).

The inner vessel 141 comprises a lower member 153 and an upper member 157 supported thereon and detachably secured to the upper end thereof. Except for the modified shape of the lower member, these members and the means of securing them to each other and supporting them in the outer container 145 may be substantially the same as in Figs. 18–21. Thus, the lower member 153 has an upper end wall 153a provided with a central opening 153e, a generally cylindrical side wall 153b whose diameter decreases progressively toward the open lower end, and a central vent tube 154 tightly secured to the top wall 153b around opening 153e, said vent tube extending upwardly within the upper member 157 to provide the annular infusion chamber B'' and being provided at its upper end with a vent opening 156; the lower end of side wall or skirt 153b is notched or recessed as at 153d to provide liquid passage openings C'' between the pressure chamber A'' and the annular liquid passage D'' and to insure a residual quantity of water for protection of the heating means and the adjacent parts of the receptacle from excessive temperature; and the upper end portion 153f of side wall 153b is of somewhat reduced diameter to provide an annular shoulder 153g. Similarly, the lower end of the cylindrical open ended upper member 157 telescopes over the reduced upper end portion 133f of the lower member and is provided with indentations 158 which frictionally engage and grip said upper end portion so as to detachably hold the parts of the inner vessel together and to provide filter passages therebetween at G" comparable to the passages G' described above.

The top wall 153a of the lower member 153 is provided as before with small orifice means for relieving pressure from pressure chamber A" prior to boiling and for admitting steam to the infusion chamber B" to agitate and heat the contents thereof, and the orifice means for this purpose may if desired be similar to the opening 33c or 133c described above. However, I have shown in this case a particularly advantageous modification in which the wall 153 is provided with two small openings 153c located diametrically opposite each other and each opening into the infusion chamber in a substantially tangential direction about the axis thereof, as indicated by the arrow in Fig. 23. These openings may be formed in any suitable manner, as for example by lancing the wall 153a upward as indicated at 155 when the member 153 is made of metal. The total area of the two openings 153c is sufficient to prevent any substantial increase in pressure in the pressure chamber prior to active boiling, but is relatively small compared with the vent opening 156 and is so small as to cause a rapid substantial increase in pressure upon boiling so as to effect the displacement of water as described above. During boiling a limited amount of steam escapes through the openings 153c to agitate and heat the contents of the infusion chamber, and this steam enters the infusion chamber with a component of velocity tangential to the axis of the chamber, causing swirling movement of the water and ground coffee and thereby producing a particularly effective agitation thereof. It will be understood that orifice means of this type may also be used in connection with any of the other forms of brewing receptacle disclosed herein.

The receptacle 140 is provided with a cover 160 secured to a control arm 183 pivotally supported on handle 150 for swinging movement about a horizontal axis between a lowered position over the inner vessel 141 and within the flared upper rim portion 146 of the outer container 145 as shown in full lines in Fig. 22 and in dot-dash lines in Fig. 24, and a raised substantially upright position at one side of the brewing receptacle as shown in dot-dash lines in Fig. 22 and in full lines in Fig. 24. When the cover 160 is in lowered position, the peripheral edge 160a thereof is spaced inwardly from the rim portion 146 of the container 145 and is spaced upwardly from shoulder 147, so as to provide annular spaces indicated at E" and F". When the cover is in its fully raised position, the lowest point of the peripheral edge 160a (indicated at 160b) is disposed radially within the upper edge of rim portion 146 of container 145 so that any condensed liquid dripping from the cover will fall within the container. With the cover in this raised position, the inner vessel 141 may be inserted in and removed from the outer container.

The cover 160 is provided with a resilient sealing member 164 which is similar to member 44 described above and is similarly mounted on a head 163 of a threaded post 162, for vertical adjustment relative to the cover by means of a nut 166 and a knob 168 on said post. The cover is movable downward to a closed position in which sealing member 164 engages the upper end of vent tube 154 to seal the vent opening 156 against outflow of steam from pressure chamber A".

This form of apparatus is also provided with electric heating means mounted on a supporting base 170 secured rigidly to the lower end of container 145, below the bottom wall 145a. The heating means is shown as an immersion type electric heating element 171 within the lower portion of the container 145, said heating element having connecting portions projecting through suitable sealing means in the bottom wall 145a to the interior of base 170, and having heating coil means suitably insulated from said container and said base.

The handle 150 is hollow and serves as a housing for the automatic control mechanism, being shown as comprising two complementary housing members 175 and 176 (see Fig. 27) secured together by suitable means such as a lower bolt at 177 and an upper pivot pin 178 (Fig. 24) and machine screws 179 (similar to the above described pivot pin 58 and screws 59 in Fig. 9). The control arm 183 is mounted on pivot member for angular movement as described above, within a slot 182 at the upper end of handle 150, upward movement of said arm being limited by engagement thereof with a shoulder 186 at the end of said slot.

Angular movement of control arm 183 is adapted to actuate control mechanism in arm 150 which regulates automatically the operation of the heating coil means and the resulting movement of the water in the brewing receptacle, and also controls the closing and opening of vent opening 156, the movement of said arm being controlled in part by such control mechanism and in part by movement of the inner vessel 141 during the brewing operation.

The control mechanism is shown particularly in Figs. 24–28. A control member 185 is carried by a shaft 190 rotatably journalled at its ends on housing members 175 and 176 for angular movement about an axis parallel to pivot pin 178. Said control member is provided at its upper end with an escapement or latch device 194 movable to different positions of engagement with a laterally bent or offset latch portion 193a on a latch extension 193 on control arm 183 at the opposite side of pivot pin 178 from cover 160, and is provided at its lower end with a manual control lever 191 extending through a slot 192 in housing member 176 for moving it in a counterclockwise direction. Escapement device 194 is notched or recessed to provide an arcuate slot 194a permitting movement thereof past the offset latch portion 193a of extension 193, and to define a stop shoulder or face 194b and a latch shoulder 195 below said slot and a stop shoulder or face 194c and a latch shoulder 196 above said slot, for engagement with said latch portion 193a.

When the cover 160 is in lowered position over the receptacle 140, said cover and the control arm 183 are urged downward by the combined action of gravity and the pull of a tension spring 201 which is provided at one end with an offset portion 201a connected at 202 to said control arm. As indicated in Fig. 24, the spring end connection 202 moves past dead center when arm 183 moves from lowered to raised position so as to retain said arm in upright position against shoulder 186. When the arm 183 is lowered, the spring end connection 202 moves below dead center and the pull of spring 201 acts with the force of gravity to urge said arm and cover 160 downward toward fully closed position in which sealing member 164 closes vent opening 156. Spring 201 is provided at its other end with a hooked portion 201b seated in annular groove 203 in an eccentric tension adjusting disk 204 on shaft 205 which is rotatably and slidably journalled in bearing means on housing members 175 and 176 and projects through the front member 176 and is provided with a manual adjusting knob 206. These tension adjusting elements are similar to those described above and shown particularly in Figs. 3, 13 and 14. The knob 206 has a rounded projection 208 on its inner side adapted to seat in any one of a plurality of angularly spaced positioning depressions in housing member 176 similar to the depressions 87 in Fig. 3, said projection being held resiliently in any selected depression by the action of a dished spring element 212 engaging a shoulder 205a on shaft 205. It will be seen that a half rotation of knob 206 in a clockwise direction will move eccentric disk 204 to the dot-dash position shown at 204' in Fig. 25 and will thus decrease the pull of spring 201 on control arm 183 for controlling the strength of the brew.

As shown diagrammatically in Fig. 24, the heating element 171 has a high heat or high wattage coil 215 of low resistance and a low heat or low wattage coil 216 of high resistance, arranged for parallel connection in a circuit controlled by a switch located in the handle 150. Said switch comprises two leaf spring switch members 217 and 218 mounted with suitable insulation in slots 219 in housing members 175 and 176 and having normally open contact points 217a and 218a. Switch member 217 is biased away from member 216 (toward the right in Figs. 24-26) to position to break the connection between contacts 217a and 218a, and is movable to closed position by a pair of links 220 (Fig. 28) pivotally connected at one end to the projecting free end 218b of said switch member and at the other end to the pivoted control member 185. The resilient switch member 218 also acts through said links 220 to urge the control member 185 in a clockwise direction about the axis of shaft 190 toward the position shown in Fig. 24, into engagement with the shaft 205 of the above described tension adjusting means, said shaft acting as a stop to limit movement of the control member 185 in that direction. Counterclockwise movement of control member 185 by means of manual lever 191, to the position shown in Fig. 25, will move switch member toward the left sufficiently to close the connection between contacts 217a and 218a.

In this form of apparatus the low heat coil 216 is connected by wires 221 and 222 to input terminal posts 223 and 224 on base 170 adapted for connection to a supply circuit by a conventional extension cord, so that this low heat coil is energized whenever said terminal posts are connected to the supply lines. Wire 221 is also connected to one end of the high heat coil 215, whose other end is connected by wire 225 to one switch member 217, and the other switch member 218 is connected by wire 226 to wire 222, thus completing the circuit for coil 215 when contacts 217a and 218a are closed. The wires 225 and 226 extend within the lower part of handle 150 and through a small housing member 227 into the interior of base 170 where they are connected to the heater circuit as described above.

In carrying out an automatically controlled brewing operation with this form of apparatus the procedure is as follows:

Assemble the inner vessel members 153 and 157 and insert the assembled inner vessel 141 in the outer container 145, putting the desired amount of water in the container 145 and the desired quantity of ground coffee in the infusion chamber B'', the cover 160 being manually raised to the position shown in Fig. 24 and in dot-dash lines in Fig. 22 so as to permit insertion of the inner vessel, and control member 185 being held by spring switch member 218 in its initial position against shaft 205.

Connect terminals 223 and 224 to the supply circuit by a suitable connecting cord, energizing low heat coil 216 only.

Lower the cover 160 toward closed position, either before or after connecting to the supply circuit. The offset latch portion 193a on extension 193 of control arm 183 engages the stop shoulder 194c on escapement device 194 to hold the control arm and the cover 160 in the position shown in full lines in Fig. 22 and in dot-dash lines in Fig. 24, with sealing member 164 spaced slightly above the vent opening 156. Under these conditions the water in the receptacle 140 may be heated partially by the low heat coil, but the brewing operation can not take place because the vent tube 154 is open to atmosphere, thus preventing creation of any pressure in the pressure chamber A''.

To start the automatic brewing operation, pull manual control lever 191 toward the right in Figs. 22 and 24, moving control member 185 and its escapement device 194 counterclockwise against the urging of spring switch member 218, to the high-heat position shown in Fig. 25. This movement is limited by engagement of the projecting upper end 185a of control member 185 with pivot pin 178 which is adapted to function as a stop member for this purpose. In moving to this position, the arcuate stop shoulder 194c moves past the offset latch portion 193a of extension 193, and releases control arm 183 and cover 160 which are moved downward by gravity and spring 201 into the fully closed position in which sealing member 164 engages the upper end of vent tube 154 to seal vent opening 156 and arrest the downward movement of the cover and control arm. This position of the control arm and cover corresponds to that shown in Fig. 15. The offset latch portion 193a moves upward into the upwardly recessed portion of escapement device 194 beyond latch shoulder 196, in position for engagement by said latch shoulder. The movement of control member 185 to this position also acts through links 220 to move switch member 218 and close the circuit of the high-heat coil 215 at contacts 217a, 218a, thus energizing both coils of the heating element and causing adequate heating of the water in the receptacle.

Release the manual lever 191. The control member 185 and its escapement device 194, and the switch member 218a will be held in the high-heat position shown in Fig. 25, due to engagement of latch shoulder 196 with the offset latch portion 193a of extension 193.

The remaining operation is fully automatic and is substantially the same as described above in connection with Figs. 1–21, except for differences in operation of the control mechanism and heating means. As before, the air and water vapor formed in pressure chamber A'' prior to active boiling are released through the small pressure release openings 153c, but active boiling creates superatmospheric pressure therein and displaces the water through openings C'' and annular passage D'' and into infusion chamber B'' in the same manner as described above, until the inner vessel becomes buoyant and rises, forcing cover 160 and control arm 183 upward with it against the force of gravity and tension spring 201, to a raised position shown in part in Fig. 26 and corresponding to that shown in Fig. 16.

This rising movement disengages offset latch portion 193a of extension 193 from shoulder 196 on escapement device 194 and swings it downward into engagement with the lower stop shoulder 194b thereon, thus limiting the upward movement of the inner vessel, cover and control arm. The sealing member 164 remains in sealing engagement with the vent opening 156 so as to maintain pressure in pressure chamber A''. When latch shoulder 196 is released by latch portion 193a, the control member 185 is moved clockwise by spring switch member 218 and links 220, until the lower latch shoulder 195 of escapement device 194 engages the offset latch portion 193a to hold the latter in an intermediate position in engagement with the lower stop shoulder 194b as shown in Fig. 26. This movement permits sufficient movement of switch member 218 to break the high-heat coil circuit at contacts 217a, 218a, leaving only the low heat coil energized. The residual heat of the heating element 171 and the lower portion of the brewing receptacle, together with the additional heat supplied by the low heat coil, causes any water remaining within the pressure chamber A'' to continue active boiling until it is substantially all displaced and water vapor begins to escape therefrom through openings C'' and annular chamber D''. At this time, the inner vessel falls for the same reasons mentioned previously and returns to its initial position with the inner vessel resting on the bottom wall 145a of the outer container. Due to gravity and the pull of tension spring 201 the cover 160 and control arm 183 also move downward sufficiently to release the offset latch portion 193a of extension 193 from escapement shoulder 195, whereupon spring switch member returns control member 185 to its original position as shown in Fig. 24, in which the upper stop shoulder 194c of the escapement device again engages the offset latch portion 193a to limit the downward movement of said cover and control arm and hold them in the initial position shown in Fig. 22 and in dot-dash lines in Fig. 24, breaking the seal at vent opening 156. With the parts in this position, the control member 185 and its escapement device 194 are entirely outside the path of movement of the offset latch portion 193a of extension 193, so that the cover 160 can be raised and lowered manually when desired.

The opening of vent port 156 releases any remaining pressure from pressure chamber A″ and the return flow of brewed coffee from infusion chamber B″ into said pressure chamber takes place in the same manner as described above in connection with automatic operation using the type of brewing receptacle shown in Figs. 18–21. The low heat coil 216 keeps the brewed coffee warm in the receptacle 140, and the inner vessal may, if desired, be removed at any time after the flow of the brewed coffee from the infusion receptacle is completed. All heat may be shut off by disconnecting the current supply to terminals 223 and 224, and the coffee may be poured from the receptacle through spout 148, either with or without removing the inner vessel 141 and with or without shutting off the heat.

An advantageous feature of the coffee brewing apparatus described herein, as compared with other pressure type coffee brewers is that the infusion chamber is located within the heated outer container and is therefore preheated somewhat during the heating of the water prior to the displacement thereof into the infusion chamber. Thus, the upper member 37, 137 or 157 and the ground coffee therein are already heated when the hot water is displaced from the pressure chamber into the infusion chamber. Also, the fact that the infusion chamber is enclosed within the heated outer container prevents any appreciable transfer of heat from the infusion chamber and its contents to the surrounding atmosphere so that the water and ground coffee, during the infusion stage, are maintained at a desirable temperature near but several degrees below boiling temperature. The small amount of steam that is directed from the pressure chamber through the small pressure releasing opening or openings 33c, 133c or 153c into the infusion chamber also assists in keeping the water at the desired temperature during infusion.

Another advantageous feature of the apparatus is that there is a definite limit on the superatmospheric pressure that can be developed in the pressure chamber. The upper end of the annular liquid passage D, D', or D″ is open to the atmosphere through annular spaces E—F, E'—F' or E″—F″, so that the maximum pressure that can occur in chamber A, A' or A″ is that required to lift water to the top of the annular liquid passage. Furthermore, since the opening or openings at C, C' or C″ are sufficiently large to permit substantially unobstructed flow of water from the pressure chamber into the lower end of the annular passage D, D' or D″, it will be seen that the pressure that can be created in the pressure chamber is limited substantially to the hydrostatic pressure of a column of water the height of the annular passage, from the bottom opening or openings C, C' or C″ to the upper edge of the inner vessel.

In the forms of automatic brewing apparatus described herein, the inner vessel is first raised buoyantly due to displacement of water from the pressure chamber, and thereafter falls due to reduction in pressure after the water has been completely displaced.

The control mechanism includes means operable in response to the upward movement of the inner vessel to reduce the heating rate of the heating means. In Figs. 1–17, the heating rate is reduced to zero, and the means operable in response to upward movement of the inner vessel to so reduce the heating rate comprises control arm 63, escapement 74, latch pawl 73, control shaft 70, cam 100, switch arm extension 109a, and switch member 107, 108 and 109. In Figs. 22–28, the heating rate is reduced to a relatively low value, and the means operable in response to upward movement of the inner vessel to so reduce the heating rate comprises control arm 183, latch extension 193, escapement 194, control member 185, links 220, and switch member 218. In both cases, the control mechanism also includes means (latch pawl 73, lower face 74a of escapement 74, and control arm 63 in Figs. 1–17, and lower stop shoulder 194b, latch extention 193, and control 183 in Figs. 22–28) for holding the sealing member 44 or 164 in position to close the vent opening 36 or 156 and thereby maintain superatmospheric pressure in the pressure chamber.

The control mechanism further includes means operable in response to the falling movement of the inner vessel to its original position, to position the sealing member 44 or 164 out of sealing engagement with the vent opening 36 or 156 and thereby release any remaining pressure in the pressure chamber. In Figs. 1–18 this last mentioned means comprises stop pawl 77, stop shoulder 74b or escapement 74, and control arm, while in Figs. 22–28 it comprises stop face 194c on escapement 194, latch extension 193, and control arm 183.

Some of the forms of apparatus disclosed herein include certain features that are also disclosed in my United States Patent No. 2,604,031, for Coffee Brewer, issued July 22, 1952 on my copending application Ser. No. 792,022, filed December 16, 1947.

The forms of the brewing receptacle and the details of the heating apparatus, of its automatic operation and control herein shown and described, are illustrative only. Hence, it will be understood that minor changes in the details of construction and arrangement of parts may be resorted to within the scope of the appended claims without departing from the spirit of the invention.

I claim:

1. A coffee brewing receptacle comprising: an open top outer container for water to be heated; an inner vessel insertible within and removable from said outer container and comprising a lower member open at its lower end and closed at its upper end to provide a pressure chamber therein, and an upper member open at its lower end detachably seated on said lower member to provide a separate infusion chamber therein, said upper member having an opening at its upper end; said lower and upper members having side walls spaced inward from the outer container to provide an annular liquid passage extending from the open lower end of the lower member to the opening at the upper end of the upper member; the upper end of said lower member and the lower end of said upper member having portions interengaging to provide filter passage means for restricted movement of liquid from the bottom of said infusion chamber to said annular liquid passage; said lower member being provided at its upper end with a vent tube communicating with the top of said pressure chamber and extending upwardly through said infusion chamber and having a vent opening at its upper end; and a cover formed to overlie the inner vessel and having a sealing member movable with said cover into and out of sealing engagement with the upper end of said vent tube upon relative vertical movement of said cover and said inner vessel.

2. A coffee brewing receptacle as set forth in claim 1, in which said cover and said outer container are provided with interengaging parts for releasably securing the cover in position to maintain said sealing member in sealing engagement with the upper end of said vent tube.

3. A coffee brewing receptacle as set forth in claim 1, in which the upper end portion of said outer container is flared outwardly to provide an upwardly facing annular shoulder, and said cover is formed to extend within said flared portion and above said shoulder, in spaced relation thereto, when said sealing member is positioned in sealing engagement with said vent tube.

4. A coffee brewing receptacle comprising: an open top outer container for water to be heated; and an inner vessel insertible within and removable from said outer container and comprising a lower member open at its lower end and closed at its upper end to provide a pressure chamber therein, and an upper member open at its lower end detachably seated on said lower member to provide a separate infusion chamber therein, said upper member having an opening at its upper end; said lower and upper members having side walls spaced inward from the outer container to provide an annular liquid passage extending from the open lower end of the lower member to the opening at the upper end of the upper member; the upper end of said lower member and the lower end of said upper member having portions interengaging to provide filter passage means for restricted movement of liquid from the bottom of said infusion chamber to said annular liquid passage; said lower member being provided with an annular shoulder above its lower end projecting outwardly and facing downwardly, and said outer container having a side wall provided with a plurality of angularly spaced inward projections positioned above the lower end of said side wall, to engage said shoulder and thereby support said lower member with its open lower end spaced above the bottom wall of said outer container and prevent contact of said lower member with said bottom wall.

5. In an apparatus for brewing coffee, the combination comprising: a container for holding water; an inner vessel insertable within said container and comprising walls defining a lower pressure chamber having an open lower end to extend into the water and a separate upper chamber for ground coffee thereabove having an opening at its upper end; said inner vessel providing an annular liquid passage between it and the side wall of said container extending from said open lower end of the pressure chamber to said opening at the upper end of the upper chamber, and also providing filter passage means for the flow of brewed coffee from said upper chamber to said annular liquid passage; heating means for applying heat to water in said container, the vapor of which is confined in said pressure chamber whereby the water is displaced from said pressure chamber and forced upwardly in said annular liquid passage around said inner vessel buoyantly to raise the latter; latch means initially operable upon upward buoyant movement of said inner vessel to restrict such movement so as to permit such upwardly displaced water to overflow said inner vessel into said upper chamber for infusion of coffee therein and to depress said inner vessel gravitationally after the water is substantially completely displaced from said pressure chamber; said latch means being operable in response to the depression of said inner vessel; control means for said heating means actuated by said latch means on movement of said inner vessel in one direction; said inner vessel comprising a lower member open at its lower end and closed at its upper end to form the pressure chamber, and an upper member open at its lower end and seated upon said lower member to provide the upper chamber for ground coffee, the engaging surfaces of said lower and upper members providing said filter passage means for the flow of brewed coffee from said upper chamber to said annular liquid passage.

6. In apparatus for brewing coffee, the combination comprising: a container for holding water; an inner vessel insertable within said container and comprising walls defining a lower pressure chamber having an open lower end to extend into the water and a separate upper chamber for ground coffee thereabove having an opening at its upper end; said inner vessel providing an annular liquid passage between it and the side wall of said container extending from said open lower end of the pressure chamber to said opening at the upper end of the upper chamber, and also providing filter passage means for the flow of brewed coffee from said upper chamber to said annular liquid passage; heating means for applying heat to water in said container, the vapor of which is confined in said pressure chamber whereby the water is displaced from said pressure chamber and forced upwardly in said annular liquid passage around said inner vessel buoyantly to raise the latter; latch means initially operable upon upward buoyant movement of said inner vessel to restrict such movement so as to permit such upwardly displaced water to overflow said inner vessel into said upper chamber for infusion of coffee therein and to depress said inner vessel gravitationally after the water is substantially completely displaced from said pressure chamber; said latch means being operable in response to the depression of said inner vessel; and control means for said heating means actuated by said latch means on movement of said inner vessel in one direction; said inner vessel comprising a lower member open at its lower end and closed at its upper end to form said pressure chamber, and an upper cylindrical member seated upon said lower member to provide said upper chamber for ground coffee, the engaging portions of said lower and upper members interfitting to detachably secure said members together and to provide said filter passage means for the flow of brewed coffee from said upper chamber to said annular liquid passage.

References Cited in the file of this patent

UNITED STATES PATENTS

| | | |
|---|---|---|
| 28,803 | Yates | June 19, 1860 |
| 61,122 | Tilden | Jan. 8, 1867 |
| 134,603 | Huch | Jan. 7, 1873 |
| 645,277 | Tourville | Mar. 13, 1900 |
| 1,072,154 | Ovington | Sept. 2, 1913 |
| 1,385,453 | Holman | July 26, 1921 |
| 1,899,541 | Bates | Feb. 28, 1933 |
| 2,181,246 | McNeil | Nov. 28, 1939 |
| 2,199,592 | Holmes | May 7, 1940 |
| 2,209,831 | Schurig | July 30, 1940 |
| 2,604,031 | Campbell | July 22, 1952 |

FOREIGN PATENTS

| | | |
|---|---|---|
| 18,147 | Germany | May 16, 1882 |
| 206,600 | Great Britain | Nov. 12, 1923 |
| 345,033 | Great Britain | Mar. 19, 1931 |